Oct. 23, 1962 T. R. BOYD 3,059,736
SPRING LOADED RETRACTABLE CAPTURED SCREW ASSEMBLY
Filed March 30, 1960
Fig.1 Fig.2 Fig.3 Fig.4
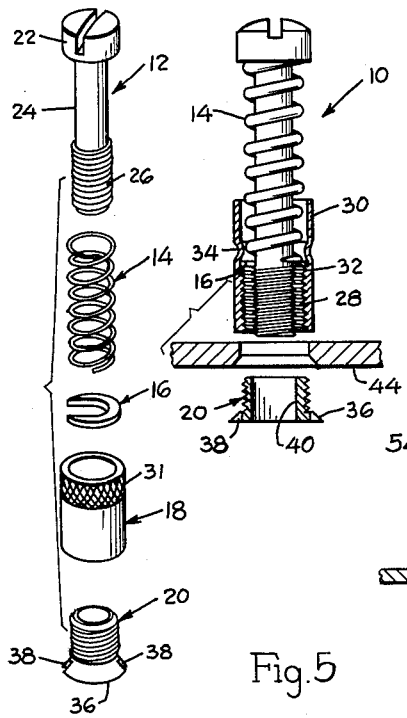
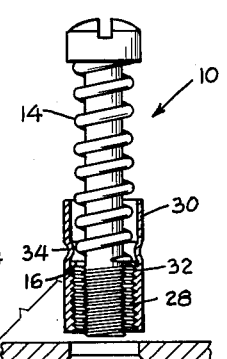
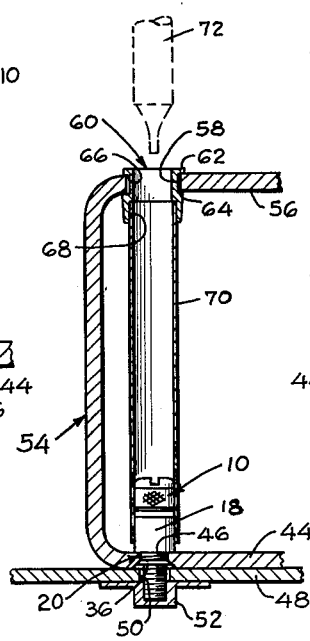
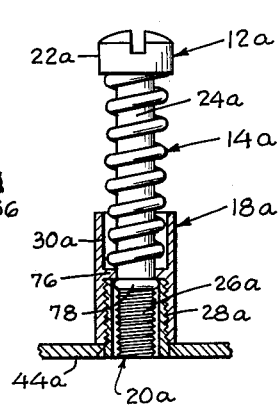
Fig.5 Fig.6
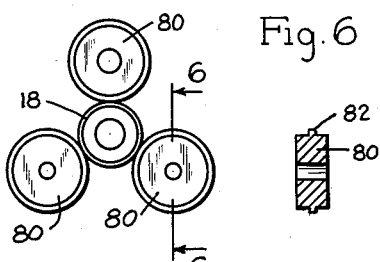
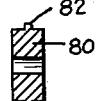
Fig.7 Fig.8
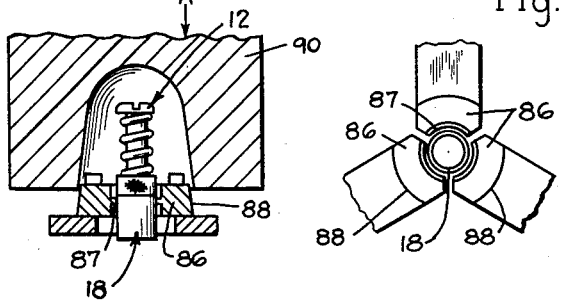
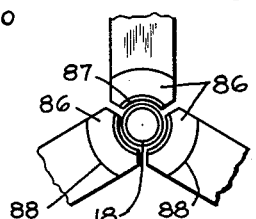
INVENTOR.
Thomas R. Boyd
BY
[signature]
Atty.

United States Patent Office 3,059,736
Patented Oct. 23, 1962

1

3,059,736
SPRING LOADED RETRACTABLE CAPTURED SCREW ASSEMBLY
Thomas R. Boyd, Palos Verdes, Calif., assignor to Illinois Tool Works, Inc., a corporation of Delaware
Filed Mar. 30, 1960, Ser. No. 18,705
3 Claims. (Cl. 189—36)

This invention relates to a fastener assembly, more specifically, it relates to a spring-loaded retractable captured screw.

Retained fastener assemblies, including spring-loaded fasteners, are not new in the art. Certain inherent problems, however, have existed in those fasteners which have been proposed in the past. Namely, the previous fasteners were specifically designed for a limited range of panel thicknesses and in order to accommodate variations in panel thicknesses, it was necessary to provide a multiplicity of different size fasteners.

It is an object of this invention to provide an improved, panel retained, removable, captive fastener. It is a further object of this invention to provide a fastener of the specified type which can be utilized in panels of widely varying thickness.

Another object of this invention is to provide a fastener of the specified type which is simple to manufacture and well adapted to mass production techniques.

Still another object of the invention is to provide a captive screw which is spring-loaded relative to the panel with which it is associated and which in its inoperative position is substantially retracted beyond the limits of the panel so as to not interfere with lateral movement of the workpiece or panel.

A still further object of the invention is to provide a captive screw threaded fastener which can be isolated from its surrounding environment.

Still other objects of the invention will become apparent when the specification is read in conjunction with the drawings wherein:

FIG. 1 is an exploded perspective view of the various components making up an embodiment of the invention;

FIG. 2 is a partial sectional view of the components of FIG. 1 in assembled relationship, but prior to installation;

FIG. 3 is a partial sectional elevation of an embodiment of the invention shown in installed position;

FIG. 4 is a second embodiment of the invention shown in partial sectional elevation in applied position to a workpanel;

FIG. 5 is a plan view of a plurality of tools utilized in forming an embodiment of the invention;

FIG. 6 is a cross section of one of said tools taken along lines 6—6 in FIG. 5;

FIG. 7 is a partial sectional elevation of a second type of tool which can be utilized to form an embodiment of the invention; and FIG. 8 is a plan view of the tools of FIG. 7 in operating position relative to the embodiment of the invention.

A captive retractable fastener assembly 10 such as the preferred embodiment seen in FIGS. 1 through 3, may include a screw 12, a spring member 14, a retainer means 16, a cylindrical bushing or housing 18, and a tubular bushing 20.

The screw 12 is preferably provided with a head 22

2 and a shank having an unthreaded portion 24 of substantial length joining the head with the threaded portion of the shank 26, the latter being generally of lesser axial extent than the unthreaded portion. Telescopically associated with the shank of the screw is a spring member 14, in the present instance a helically coiled compression spring. Spring 14 preferably has in its unstressed condition an axial extent slightly greater than the unthreaded shank portion 24, for purposes best set forth hereinafter, with the upper extremity of the spring 14 abutting the underside of head 22. At the juncture of the unthreaded portion 24 and the threaded portion 26 of the shank there is provided a laterally extending retainer means 16. In the disclosed embodiment, means 16 takes the form of a semi-resilient C-ring whose slot is substantially equal to the unthreaded shank portion 24, but less than the outer diameter of the threaded shank portion 26. It is rotatably retained on the screw and capable of axial movement along the unthreaded shank portion, but acts as a stop relative to movement along the threaded portion 26. The outside dimension of the ring 16 is greater than the outer dimension of the spring 14, whereby, because of the excess length of spring 14 relative to the length of unthreaded shank portion 24, the spring abuts the upper surface of ring 16 and is constantly under very slight compression which normally maintains the ring 16 against the last convolution of the threaded shank portion 26. It is to be recognized, of course, that the C-ring disclosure made herein is but one of the methods which can be utilized to retain the spring relative to the axis of the screw shank. Another known way is to utilize the teachings of Crowther Patent No. 2,113,424 and provide a continuous washer (not shown) of suitable dimensions to be mounted on the unthreaded shank portion 24 and retained in that position by the extrusion of threads at the free extremity of the screw by the process commonly known as thread rolling.

The screw, spring, and ring sub-assembly is telescopically mounted within a cylindrical bushing or housing 18. Housing 18 preferably has a substantially uniform external diameter and is provided internally with at least two portions of differing diameters. At the lower end 28, as viewed in the drawings, housing 18 is internally threaded, and presents the lesser of the two diameters shown. The upper internal portion of housing 18 has a relatively smooth bore, thereby resulting in an intermediate shoulder 32 formed by the upper or last convolution of the threaded portion 28 which is of lesser diameter than the unthreaded portion 30. The outer wall of portion 30 may be provided with knurls 31 or other suitable gripping means.

The threaded end of the screw sub-assembly is telescopically associated with the housing 18 from the unthreaded end 30 until the ring 16 which is substantially complementary on its outside diameter to the unthreaded portion 30 is seated on the shoulder 32. Axially spaced above shoulder 32 there is provided an inwardly directed shoulder or protuberance 34 which bears against the upper side of ring 16, thereby capturing ring 16 between shoulders 32 and 34 respectively. For purposes best set forth hereinafter, the threaded shank portion 26 of screw 12 is preferably of such axial extent as to be substantially equal to or only slightly greater than the axial extent of the threaded portion 28 of the housing 16.

The final member to complete the retainer assembly is the tubular bushing 20. Bushing 20 in the preferred embodiment is externally threaded and provided with a counter-sunk head 36 having suitable driving means 38. The bushing 20 is of a relatively thin walled nature and has such diametral proportions both internally and externally that its external threads are complementary to the lower threaded portion 28 of housing 18 while its through-bore 40 is of such size as to permit free axial and rotary passage of the screw 12. The axial extent of the threaded portion of bushing 20 is substantially equal to the lower threaded portion of housing 18. It is of substantial axial extent so that a wide variety of sheet thicknesses in the workpiece can be accommodated by its assembly with housing 18.

In operation, a workpiece 44 is punched or drilled to provide an aperture 46 which is substantially identical in diameter to the threaded portion of bushing 20, and, in the present instance, may be counter-sunk on one side to accept head 36 of bushing 20 to provide a flush panel mounting. The housing 18 is positioned on the opposite side of the sheet and bushing 20 is threaded into housing 18, as best seen in FIG. 3. A workpiece 44 can be then secured to a second panel 48 in juxtaposition thereto. Panel 48 is provided with an aperture 50 in register with aperture 46 and suitable female thread engaging means 52, of which many types are known in the art, is secured to the opposite side of panel 48. Nut 52 is complementary to screw 12 and upon axial and rotative movement of screw 12 within the housing 18 and through bushing 20 the threads of screw 12 are mated with the nut 52 to draw up the panel 48 against workpiece 44 and to assure a snug relationship therebetween.

The installation shown in FIG. 3 discloses not only the retention of one panel 44 relative to a second panel 48, but also discloses means for isolating the fastener assembly from surrounding environment. As shown in the drawings, workpiece 44 is the bottom wall of a closed container 54. Oftentimes it is desirable to present a smooth outer periphery to a container 54 and therefore the problem exists as to the control of fastening elements internally positioned. In the present instance, the wall 56 opposite to workpiece 44 is apertured as at 58, with aperture 58 being in registry with aperture 46. A non-metallic grommet 60 is adapted to be positioned within aperture 58. Grommet 60 has a head 62 of greater diameter than aperture 58 for bearing against the upper surface of panel 56 as well as shoulder means 64 spaced a sufficient distance from the underside of head 62 to engage the underside of panel 56 and retain the grommet 60 within the aperture. Grommet 60 is further provided with an internal through-bore 66 which is counterbored at its lower end 68, as viewed in the drawings. The diameter of bore 66 is controlled so as to be substantially equal to the external diameter of housing 18. A tubular member 70 is seated within the counterbore 68. Member 70 may be of a thin wall nature and preferably has an internal diameter substantially equal to bore 66 and is of sufficient axial extent to traverse the distance between grommet 60 and a substantial portion of the housing 18. If desired, as in the present embodiment, the tubular member 70 may be fabricated from a dielectric material such as nylon. It will be appreciated that the assembly set forth hereinabove is ideally adapted for use in mounting electronic components to a panel where space is at a premium and external mounting flanges on containers such as 54 are prohibitive from the space standpoint. The internal components within the container are isolated and protected from any possible contact or damage by a tool 72, shown in phantom, when tool 72, shown in retracted position, is inserted through bore 60 and tubular member 70 into axial and rotative engagement with the driving means of screw 12 to render the fastener 10 operative.

A second embodiment of the present invention is best seen in FIG. 4 wherein similar parts bear similar numerals with the addition of the suffix "a." In this embodiment the screw 12a is provided with a head 22a, an unthreaded shank portion 24a, and a threaded shank portion 26a. A spring member 14a is telescopically associated with the unthreaded shank portion 24a. The housing 18a has a threaded lower portion 28a and an unthreaded upper portion 30a of greater diameter than the lower portion. At the juncture of the two portions there is provided an inwardly directed annular shoulder having a bore substantially equal to or slightly larger than the threaded portion of the screw 26a. The screw and the spring associated therewith are inserted from the upper end through the housing and through the bore in shoulder 76. Outwardly directed protuberance means 78 are introduced to the screw at the juncture of the threaded and unthreaded shank portion. Protuberance means 78 extends laterally outwardly and is greater in diameter than the bore of the shoulder 76. In the present instance, the protuberance means 78 is material which is laterally displaced from the shank of the screw itself. It should be recognized, however, that other suitable means can be employed with equal success, for example, a retaining ring such as retainer means 16. The bushing 20a and method of assembly to a panel 44a are substantially the same as the previous embodiments disclosed.

Referring back to the preferred embodiment set forth in FIGS. 1 through 3, it has been found that this embodiment is the most economical to produce. The method of producing the preferred embodiment is to preassemble the screw 12, spring 14, and retaining element 16. Then the sub-assembly is telescopically associated with the housing 18 with the retainer means 16 resting on the shoulder 32. Two techniques have been utilized by the inventor to produce satisfactory results in the formation of the inwardly directed protuberance 34. Protuberance 34 is preferably a continuous annular ring which can be formed by radially distorting the material of housing 18. One method is to provide a plurality of rollers 80 at space points about the periphery of housing 18 and to radially move these inwardly while rotating. In the instance illustrated, there are three rollers 80 which balance the forces against the housing 18 during deformation. An individual roller 80, as viewed in FIG. 6 in cross section, is provided with an outstanding annular ring 82 which deforms the material of housing 18 during rotation. A second method of deforming housing 18 includes the use of a plurality of dies 86, each having a reduced nose portion which is cut out in the form of an arc of a circle, in the present instance 120 degrees of arc. The reduced cut out portions of each die 86 has an inwardly directed, hardened, ridge 87 which when forced radially inwardly forms a segment of the protuberance 34. An outer edge 88 of each die is tapered to provide, when taken in combination with the other dies, segments of a frusto-conical form. A tool 90 having an internal bore of frusto-conical form complementary to the outer edges 88 is moved downwardly under the application of a force "A." This forces the dies 86 radially inwardly and ridge 87 forces the wall of housing 18 inwardly producing the internal protuberance 34. It should be noted that due to the thin wall characteristics of housing 18, it is necessary, as shown in both methods, to produce a uniform protuberance 34 substantially perpendicular to the housing axis so that screw 12 with its retainer 16 does not become cocked in its retained position.

The slight compression of spring 14, acting on retainer ring 16, normally maintains the threaded portion 26 of screw 12 up within the axial limits of housing 18.

Thus, this invention provides a captively retained male screw threaded fastener which is retractable beyond the limits of the panel to which it is attached. Further, because of the axial adjustability of bushing 20 relative to housing 18, it is possible to provide a fastener of the type described which is adaptable for use in a multiplicity of panel thicknesses. In addition, the invention discloses a fastener suitable for an internal installation with means for isolating the fastener and the operating tool from the internal environment in which the fastener is placed. Similarly, economical methods of fabrication have been introduced by the inventor for use in the manufacture of an embodiment of the invention.

Modifications of the invention will be apparent to those skilled in the art, but it is the intent of the inventor to be limited in the scope of his invention only by the appended claims.

I claim:

1. A retained fastener assembly for association with an enclosed box having spaced co-axial apertures in opposite walls thereof adapted to fasten the box to an apertured workpanel including a one piece screw having a head with driving means and a shank, said shank being partially threaded adjacent its free end and said head being spaced a substantial distance from the threaded portion by an unthreaded shank portion of lesser diameter than either the head or threaded portion, a coil spring encircling said unthreaded portion with its upper limit abutting the underside of the head of the screw, a washer device having an outer diameter substantially greater than said spring rotatably mounted on the unthreaded portion and normally urged by the lower limit of said spring into abutting relationship with the last thread convolution of said shank closest to said head, a first cylindrical bushing internally threaded along a substantial portion of its length, said bushing having a substantially uniform external diameter but having at least two differing internal diameters so as to form an inwardly directed shoulder, said screw, washer and spring being telescopically associated with said bushing with said washer in engagement with said shoulder, annular inwardly directed protuberance means axially spaced from said shoulder so as to capture said washer therebetween, said threaded portion of said screw normally being positioned within said first bushing, a second tubular bushing having external threads adapted to be accepted by said internally threaded cylindrical bushing and a through bore, said second bushing having a countersunk flat head, the diametral relationship of the two bushings and the screw being such that when they are all telescopically assembled the screw shank is free to be axially moved and rotated within both bushings and the screw head is smaller in diameter than the outer diameter of said first bushing, a counter-sunk apertured plate forming one wall of said box adapted to accept said second bushing from the outside thereof in a flush surface manner, said aperture being greater than said second bushing and less than said first bushing whereby when the two are assembled the first bushing abuts and projects inwardly from the inside surface of said plate, a third tubular bushing of resilient material including a laterally extending head and a shank, said shank having shoulder means intermediate its length in opposition to said head and adapted to be accepted by and snapped into an apertured plate forming the opposite wall of said box with said head bearing against the exterior wall of said box, the pass-through bore of said third tubular bushing being counterbored at the end opposite the head, a tube adapted to extend between and be accepted within said counterbore of said third bushing and over said first bushing and its associated projecting screw head whereby a tool can be inserted through said third bushing and tube and engage the driving means on said head, female fastener means mounted below the aperture of said workpanel for accepting said screw whereby when a tool inserted through said tube axially engages the screw head, compresses the spring and projects the threaded portion through the second bushing and beyond the outside surface of said first plate said screw will be engaged and removably retained by said female fastener means.

2. A retained fastener assembly for association with an enclosed box having spaced coaxial apertures in first and second opposite walls thereof adapted to fasten the box to an apertured work panel including a one-piece screw having a head with driving means and a shank, said shank being partially threaded adjacent its free end and said head being spaced a substantial distance from the threaded portion by an unthreaded shank portion of lesser diameter than either the head or threaded portion, a coil spring encircling said unthreaded portion with its upper limit abutting the underside of the head of the screw, a washer device having an outer diameter substantially greater than said spring rotatably mounted on the unthreaded portion and normally urged by the lower abutting limit of said spring into relationship with the last thread convolution of said shank closest to said head, a first cylindrical bushing internally threaded along a substantial portion of its length, said bushing having a substantially uniform external diameter but having at least two differing internal diameters so as to form an inwardly directed shoulder, said screw, washer and spring being telescopically associated with said bushing with said washer in engagement with said shoulder, annular inwardly directed protuberance means axially spaced from said shoulder so as to capture said washer therebetween, said threaded portion of said screw normally being positioned within said first bushing, a second tubular bushing having external threads accepted by said internally threaded cylindrical bushing and a through bore, said second bushing having a countersunk flat head, the diametral relationship of the two bushings and the screw being such that when they are all telescopically assembled the screw shank is free to be axially moved and rotated within both bushings and the screw head is smaller in diameter than the outer diameter of said first bushing, a countersunk apertured plate forming said first wall of said box accepting said second bushing from the outside thereof in a flush surface manner, said aperture being greater than said second bushing and less than said first bushing whereby the first bushing abuts and projects inwardly from the inside surface of said plate, a tube encompassing said first bushing and extending from said first bushing to said second wall, means securing said tube to said second wall, the minimum diameter of said tube being at least equal to the external diameter of said first bushing whereby a tool can be inserted through said tube in a manner to permit engagement with the driving means on said head and prevent engagement with other contents of said box, female fastener means mounted below the aperture of said work panel for accepting said screw whereby when a tool inserted through said tube axially engages the screw head, compresses the spring and projects the threaded portion through the second bushing and beyond the outside surface of said first plate said screw will be engaged and removably retained by said female fastener means.

3. A variable panel thickness retained fastener adapted to be mounted in an apertured panel including a tubular housing having a substantially uniform external diameter, said housing having a through bore which is counterbored from a first end, a second portion of the bore which is not counterbored being internally threaded adjacent a second end, radially inwardly deformed wall portions of said tubular housing forming protuberance means intermediate the length of said through bore and adjacent said threads and spaced therefrom a short distance, a headed screw having an intermediate unthreaded shank portion connecting the head with a thread rolled portion extending to the end opposite said head, a laterally extending washer element axially movably positioned and retained on the unthreaded shank portion adjacent the last convolution of the threads of said shank, a coil spring encircling the unthreaded shank portion and abutting the underside of the head and said washer element, said screw and spring being telescopically associated with said housing from the counterbored end with the laterally extending washer element being axially positioned and confined in the area between the inwardly directed protuberance and the threaded section of said tubular housing, the threaded portion of the screw shank being of such an axial extent as to be normally maintained within the housing coaxially with and radially spaced from the internally threaded portion of the housing and adjacent said second end, an externally threaded headed tubular nut for association with said second end and complementary to the internally threaded portion of the housing and having a smooth walled bore with a diameter larger than the crest diameter of the screw thread whereby it is radially spaced from said threaded portion of the screw shank to permit axial movement of the screw through the nut, whereby said housing and associated screw can be mounted on the top face of a work panel with said tubular nut extending from the underside of the panel through said aperture to draw the second end of the housing tightly against the top face of said panel.

References Cited in the file of this patent

UNITED STATES PATENTS

| | | |
|---|---|---|
| 632,187 | Joyce | Aug. 29, 1899 |
| 1,967,039 | Mohr | July 17, 1934 |
| 2,201,793 | Sanborn | May 21, 1940 |
| 2,831,520 | Clarke | Apr. 22, 1958 |
| 2,936,015 | Rapata | May 10, 1960 |